United States Patent [19]
Ives

[11] Patent Number: 6,126,207
[45] Date of Patent: Oct. 3, 2000

[54] ROTARY JOINT WITH SHEAR PINS

[75] Inventor: Alan T. Ives, Marcellus, Mich.

[73] Assignee: The Johnson Corporation, Three Rivers, Mich.

[21] Appl. No.: 09/264,645

[22] Filed: Mar. 8, 1999

[51] Int. Cl.[7] .................................................... F16L 39/04

[52] U.S. Cl. ......................... 285/121.1; 285/95; 285/276; 285/61

[58] Field of Search .............................. 285/1, 2, 3, 276, 285/123.15, 127.1

[56] References Cited

U.S. PATENT DOCUMENTS

| | | | |
|---|---|---|---|
| 4,262,940 | 4/1981 | Wiedenbeck et al. | 285/61 |
| 4,295,484 | 10/1981 | Meisenheimer | 285/2 |
| 4,635,969 | 1/1987 | Jackson | 285/95 |
| 5,169,181 | 12/1992 | Timm et al. | 285/276 |

Primary Examiner—Lynne H. Browne
Assistant Examiner—Aaron M Dunwoody
Attorney, Agent, or Firm—Young & Basile, P.C.

[57] ABSTRACT

A self-supported rotary joint for introducing a heating or cooling medium, such as steam or water, into a rotating drying or cooling drum. The rotary joint is supported upon the drum structure by a rotating bearing housing whose bearings support the stationary nipple. The nipple supports the stationary rotary joint body head, and the stationary syphon support tube which supports the stationary syphon structure inside the drum. To prevent damage to the hoses supplying steam or water to the joint body head, and removing condensate or water from the joint, in the event of bearing seizure causing rotating of the nipple, the joint body head is mounted upon the nipple outer end by frangible connectors in the form of shear pins which prevent excessive torque being imposed on the joint body head. The support tube serves as a thermal steam sleeve which is interposed between the steam and bearings to reduce bearing temperatures, and the bearings are axially located by spring means maintaining the bearings' position within the bearing housing regardless of thermal expansion.

8 Claims, 2 Drawing Sheets

ROTARY JOINT WITH SHEAR PINS

BACKGROUND OF THE INVENTION

1. Field of the Invention

The invention pertains to the field of rotary joints as used with heating or cooling drums such as the dryer drums employed in the manufacture of paper.

2. Description of the Related Art

Self-supported rotary joints, as compared to trunnion mounted rotary joints, are supported by the associated rotating drum structure, and have the advantage of being relatively concise in configuration, and are easy to install and maintain. However, because self-supported rotary joints are supported by a bearing housing affixed to the rotating drum structure supporting the syphon, and prevented from rotating by the use of a torque lug, the "freezing" of a bearing within the bearing housing will cause the rotary joint nipple, which is stationary and supports the joint body head, to rotate. Rotation of the nipple will cause the joint head to rotate destroying the hose conduits attached to the head for supplying steam or water, and for removing condensate. The conduits attached to the rotary joint head are usually flexible hose reinforced with wire, and upon rotation of the joint head, the torque lug and associated anchor will be broken, the joint hoses will fracture and rotate, and the jagged edges and rotating wire will spin creating a very hazardous situation for personnel in the surrounding area. Steam will be vented to the area and until attention can be given to the situation, considerable damage can be experienced and personnel threatened.

With the advent of faster and heavier dryer drums, and larger rotary joints, it is desirable to support the rotary joint and associated nipple upon roller bearings, rather than carbon bushings. However, as roller bearings require regular lubrication and are more prone to "freezing" and seizure than carbon bushings, the use of roller bearings in self-supported rotary joints has been limited in the past compromising the desired rotary joint designs for large or high speed installations.

Objects of the Invention

It is an object of the invention to provide a self-supported rotary joint wherein the joint body head is mounted upon a stationary nipple supported by bearings and wherein upon freezing of the bearings to cause rotation of the nipple, the joint body head is automatically released from the nipple to prevent rotation of the body head.

Another object of the invention is to provide a self-supported rotary joint wherein frangible means support the joint body head to protect the same from rotation.

A further object of the invention is to provide a self-supported rotary joint supported upon anti-friction bearings utilizing a thermally insulating nipple to reduce the operating temperature of the bearings when steam is transferred through the rotary joint.

Yet a further object of the invention is to provide a self-supported rotary joint supported upon roller bearings wherein the bearings are subjected to an axial biasing force to maintain the position of the bearings during thermal expansion thereof.

An additional object of the invention is to provide a self-supported rotary joint supporting a stationary syphon wherein the horizontal portion of the syphon support tube functions in the dual purpose of in addition to supporting the syphon, the syphon support tube functions as a steam sleeve to aid in thermally insulating the bearing structure from the steam.

SUMMARY OF THE INVENTION

In a self-supported rotary joint for rotating drums, a bearing housing is concentrically mounted upon the drum structure for rotation with the drum. Anti-friction bearings are located within the bearing housing and these bearings provide the support for the outer end of a tubular nipple extending through the drum journal for introducing steam into the drum, and usually providing support for syphon structure located within the drum.

The joint body head is mounted upon the outermost end of the nipple by shear pins, and a torque lug defined on the body head engages a torque anchor to prevent rotation of the body head and possible damage to the hoses connected to the body head for the heat transfer medium, such as steam, water and condensate.

In the event that one or more of the anti-friction bearings within the bearing housing freezes or seizes due to corrosion or other bearing failure, the rotation of the bearing housing will be transferred to the nipple causing the nipple to rotate. This high torque applied to the nipple will be transferred to the joint body head, whose rotation is resisted by the torque lug associated therewith. The rotation of the nipple, and the resistance to rotation of the body head, will fracture a pair of shear pins interposed between the nipple and body head permitting the nipple to continue to rotate, but preventing such rotation to be transferred to the body head.

Upon fracturing of the shear pins, steam will begin to leak from a previous static 0-ring seal which has now become dynamic, and this steam leakage will be noted by maintenance workers who become aware of the bearing seizure. Also, an electric alarm may be mounted adjacent the bearing structure to sense nipple rotation and electrically indicate the bearing seizure.

With large size self-supported rotary joints, it is desirable to use roller tapered bearings to support the rotary joint due to their ability to carry higher loads than ball bearings. However, tapered roller bearings require lubrication, and the high temperatures to which the bearings are exposed due to the steam temperature make the proper lubrication of roller bearings difficult. To improve roller bearing life, the invention employs a steam sleeve inside the nipple and the steam sleeve is fixed to the nipple for accurate rotation therewith. The nipple includes a recess or void which retards the transfer of heat between the nipple and the syphon support tube/steam sleeve permitting the bearings to operate at a lower temperature than otherwise, increasing bearing life. A further improvement upon increasing bearing life is achieved by the use of spring means interposed between the roller bearings to properly axially locate the roller bearings within their housing, and the utilization of this spring means permits an accurate axial positioning of the roller bearings at all bearing temperatures, and accommodates bearing thermal expansion.

BRIEF DESCRIPTION OF THE DRAWINGS

The aforementioned objects and advantages of the invention will be appreciated from the following description and accompanying drawings wherein:

FIG. 3 is an exterior perspective view of a self-supported rotary joint constructed in accord with the invention illustrating the supply and syphon hoses and torque lug structure.

DESCRIPTION OF THE PREFERRED EMBODIMENT

Figure 1:
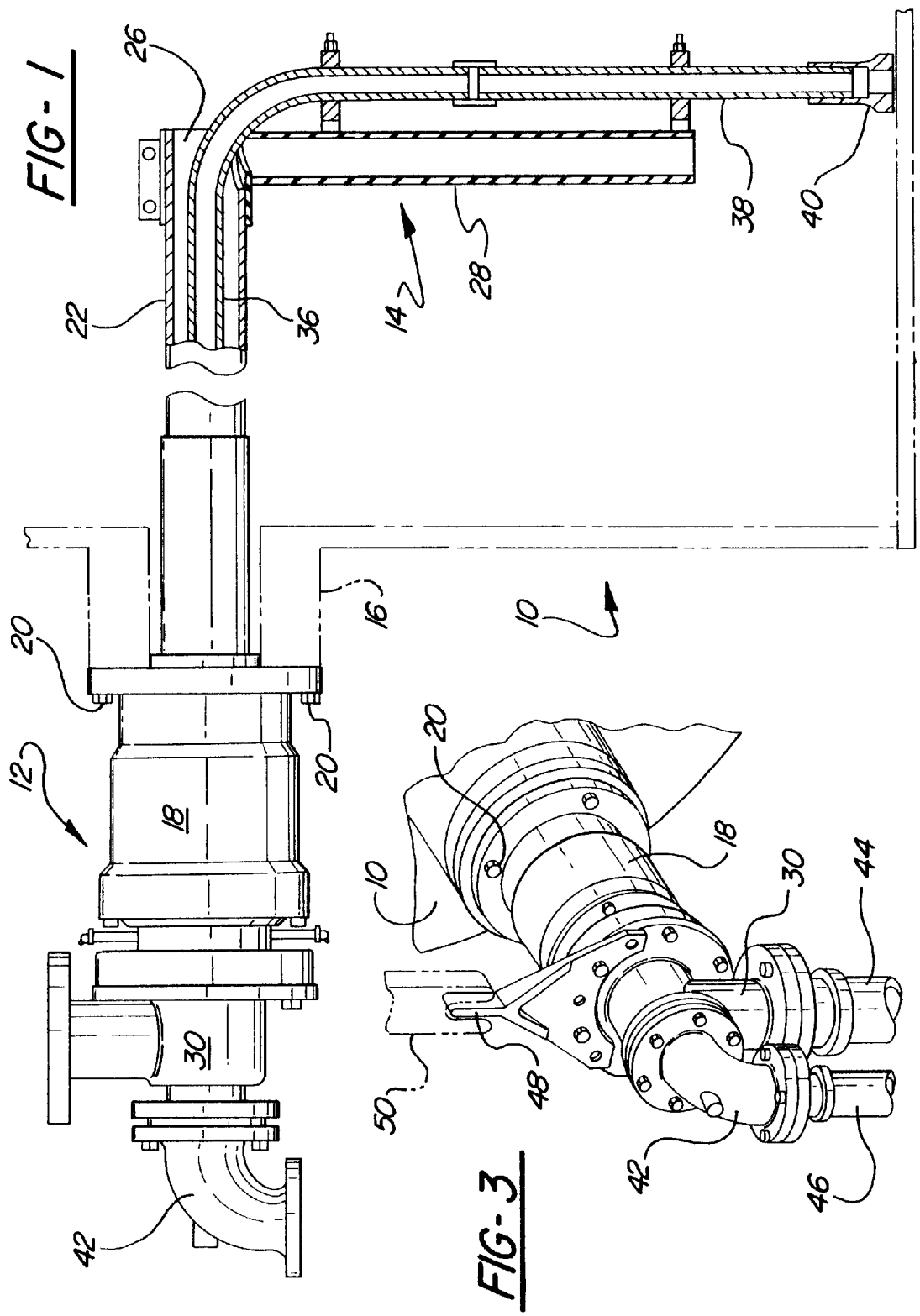
FIG. 1 is a diametrical elevational partially sectional view illustrating a self-supported rotary joint utilizing the concepts of the invention, and also illustrating typical syphon structure, the rotary drum being shown in dotted lines.

A typical rotatable heat exchanging drum 10 is illustrated in dotted lines in the drawings. Such a drum is commonly used in paper making mills for drying purposes, and in some situations, similar drums are used for cooling purposes. When drying, drums 10 receive high temperature steam, and the steam is introduced into the drum 10, and condensate removed therefrom, by a rotary joint generally indicated by 12. When condensate is being removed from the drum, the rotary joint includes a syphon system 14 located within the drum for removing condensate or water therefrom, as is well known.

The drum 10 includes supporting shaft structure 16 defining an axis of drum rotation to which an annular bearing housing 18 is affixed by bolts 20. The bearing housing 18 is of an annular configuration, and houses and supports bearing structure, later described, which in turn supports the tubular nipple 66 and syphon support tube 22 which is normally horizontally disposed and includes an outer end 24 located exteriorly of the drum 10, and an inner end 26 extending into the drum interior, FIG. 1, whereby steam is introduced into the drum. The syphon support tube inner end 26 includes a syphon pipe support 28, and the nipple outer end is supported inside the rotary joint nipple. The nipple 66 supports the rotary joint body head 30 which includes the steam inlet port 32 to which the steam supply hose is connected. The body head 30 includes an axial opening in which the cylindrical syphon bushing 34 is mounted, and the horizontal syphon pipe 36 extends through the center of the syphon support tube 22 having a vertical syphon portion 38 attached to the syphon pipe's inner end, FIG. 1, and the end of the syphon 38 has the usual syphon shoe or foot 40 affixed thereto located adjacent the drum inner surface for removing water or condensate from the lowermost portion of the drum 10. In the illustrated structure, the syphon 38 is of the "stationary" type wherein the syphon structure does not rotate with the drum and the syphon foot 40 is always located adjacent the lowermost portion of the drum for removing condensate therefrom.

A syphon fitting 42 is bolted to the body head 30 in communication with the outer end of syphon pipe 36, and exteriorly, the body head includes a radially extending torque lug 48, FIG. 3, which cooperates with a stationary torque anchor 50, and the cooperation of the lug 48 and anchor 50 resists rotation of the body head 30 about the drum axis of rotation.

Steam is supplied to the body head 30 and its inlet 32 by a reinforced steam hose 44, FIG. 3, while the condensate is removed from the rotary joint by the syphon hose 46, FIG. 3, communicating with the syphon fitting 42.

The bearing housing 18 houses a pair of axially spaced tapered roller bearings set, 52 and 54. An annular collar 56 is located between the bearings 52 and 54 and engages a stop ring 58 located within an annular groove defined in the steam sleeve to axially position the roller bearing 54. An annular disc spring 60 interposed between the end of the collar 56 and inner race of bearing 52 imposes an axial biasing force on the bearing 52 and permits accommodation of axial bearing expansion due to the rise in temperature of the bearing components. The roller bearings 52 and 54 are maintained within the bearing housing 18 by an annular bearing cap 62 held in place by screws 64 threaded into the bearing housing.

In order to reduce the transfer of heat from the syphon support tube outer end 24 to the bearings 52 and 54, an annular air space 74 is provided between the nipple and the syphon support tube. The nipple 66 includes a tapered bore 68 which cooperates with a tapered surface 70 defined on the syphon support tube 22 outer end to accurately locate the syphon support tube in the nipple, and O-ring seals 72 between the syphon support tube and the nipple prevent steam from entering the annular air space 74 defined in the inner bore of the nipple. Accordingly, the air space 74 forms an annular void between the hot syphon support tube 22 and the inner race of bearings 52 and 54 and reduces the amount of heat transferred between the support tube and the bearings due to the low heat transfer characteristics of the chamber defined by air space 74.

Figure 2:
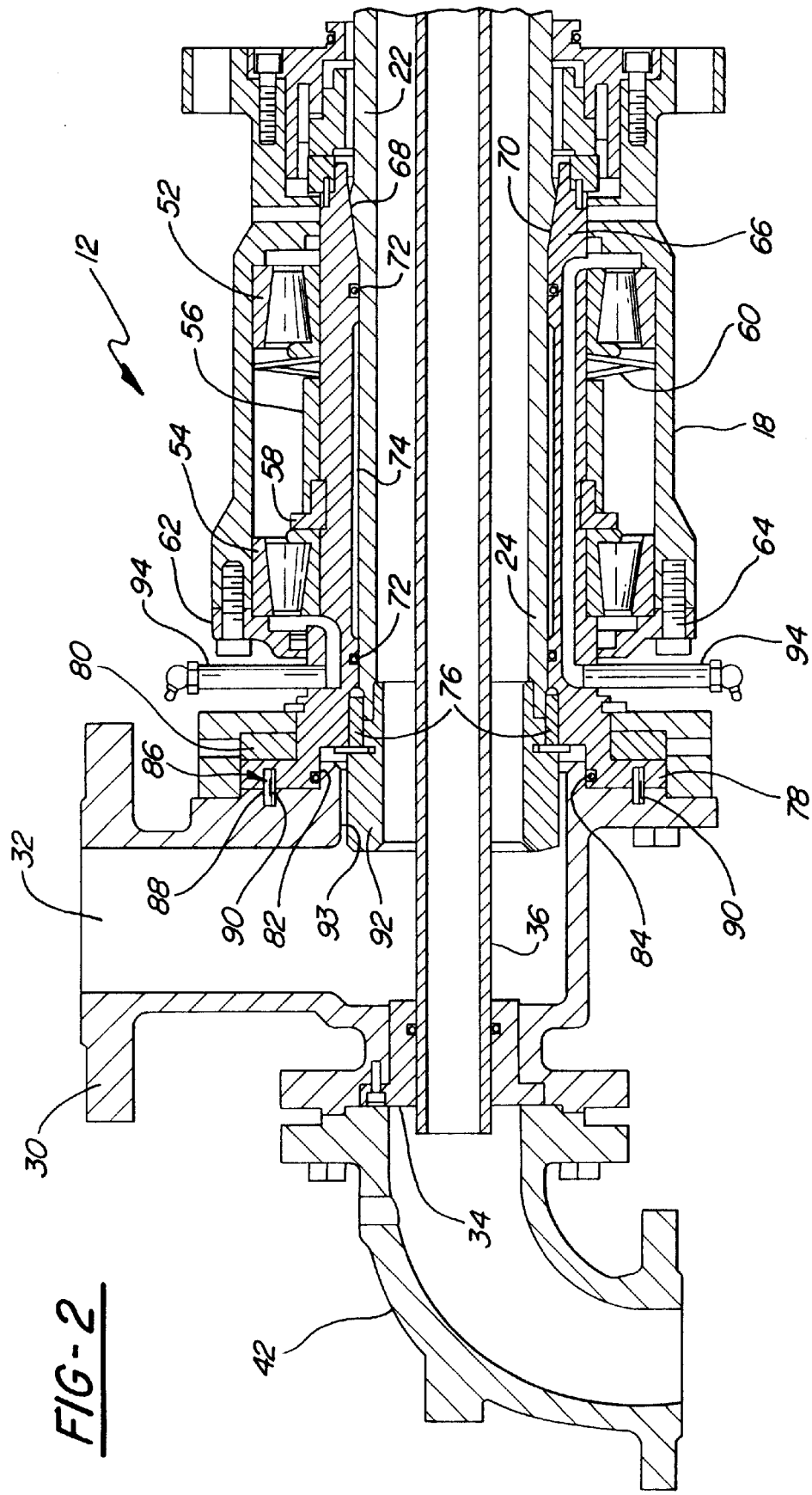
FIG. 2 is an enlarged elevational diametrical sectional view of the rotary joint, per se.

The syphon support tube 22 outer end is affixed to the nipple with locating key pins 76, FIG. 2, and a hollow threaded nut fastener 92 that pulls the taper 70 on the support tube 22 into the taper 68 inside the nipple. The outer end of the nipple 66 includes a radially extending flange 78 that rests against an annular carbon bushing 80. An axial shoulder 82 is defined on the body head 30 which cooperates with an O-ring seal 84 to statically prevent the escape of steam between the body head or nipple, and the atmosphere. Axially extending holes 86 are defined in the flange 78 in alignment with the axially extending holes 88 defined in the body head in spaced relation to the nipple axis, and a pair of diametrically related shear pins 90 are located within the holes 86 and 88 forming a torque resistant connection between the nipple and support tube and the body head 30. The shear pins 90 prevent relative rotation between the syphon support tube/steam sleeve and nipple assembly, and the body head during normal operation of the rotary joint.

Lubrication of the roller bearings 52 and 54 is accomplished through grease fitting necks 94 which communicate with appropriate passages leading to the bearings as will be appreciated from FIG. 2.

If it is desired to utilize an electric alarm switch to sense rotation of the nipple, an electric switch, not shown, may be mounted adjacent structure affixed to the nipple outer end such as the grease necks 94.

In normal operation, steam is introduced into the rotary joint 12 by the hose 44 and through tube 22 into drum 10 and the condensate is removed by the hose 46. The bearing housing 18 rotates with the drum 10 and the bearing housing supports the nipple 66 which, in turn, supports the rotary joint body head 30 and the outer end 24 of the syphon support tube 22. This type of rotary joint arrangement is considered to be "self-supporting" as total support of the rotary joint structure is through the drum structure.

Due to the engagement of the body head torque lug 48 with the torque anchor 50, the rotary joint head 30 is held against rotation due to the small rotational frictional forces of the bearings and the syphon support tube 22 and associated syphon support structure 28 will be stationary. The shear pins 90 prevent rotation of the nipple and its associated structure when the rotary joint operates in its normal manner.

In the event that one or both of the roller bearings 52 or 54 malfunctions and freezes or seizes, very high torque forces will be suddenly applied to the nipple 66 and to the syphon support tube 22. Such torque forces will also tend to rotate the rotary joint body head 30 and would fracture the torque lug 48 or torque anchor 50 except for the fact that the shear pins 90 are designed to shear in such a situation, and large torque forces will not be applied to the body head 30 by the rotating nipple 66, flange 78 and syphon support tube 22. The reception of the nut fastener 92 into the body head bore 93, which is now turning, acts as a guide to maintain the position of the head, and the rotation of the syphon pipe 36 within syphon bushing 34 will maintain the alignment of the syphon pipe relative to the body head 30.

Upon shearing of the pins 90, rotation occurs between the flange 78 and the body head shoulder 82 causing the previously static seal 84 to become a dynamic seal, and the seal 84 will very quickly begin to leak steam indicating to maintenance personnel that the shear pins 90 have been fractured. Additionally, an electric switch, not shown in the claims, if used, will also indicate rotation of the steam sleeve and nipple assembly indicating the seizing of a bearing.

From the above description, it will be appreciated that the use of the frangible shear pins 90 protects the body head 30 against rotation, and prevents the destruction of the hoses 44 and 46 and attendant dangerous condition that occur if these hoses fracture. Accordingly, the practice of the invention permits roller bearings to be used with large self-supported rotary joints while eliminating the problems previously existing with respect to such use of roller bearings.

It is appreciated that various modifications to the inventive concepts may be apparent to those skilled in the art without departing from the spirit and scope of the invention.

What is claimed is:

1. A self-supported rotary joint for introducing steam into a heat exchanging drum rotating about an axis of rotation, comprising, in combination, an elongated tubular bearing housing adapted to be affixed to the drum concentric to the drum's axis of rotation for rotation with the drum, a tubular nipple concentric with the drum axis of rotation within said bearing housing, a bearing means mounted within said housing interposed between said housing and said nipple supporting said nipple, a rotary joint body head, a frangible means connecting said body head to said nipple, a steam inlet defined in said body head in communication with a steam tube having an outer end extending through said nipple and an inner end located within the drum, and an anti-rotation means defined on said body head resisting rotation of said body head about the drum axis of rotation, said frangible means fracturing upon torque force imposed upon said body head by said nipple exceeding a predetermined value.

2. In a self-supported rotary joint as in claim 1, a stationary syphon pipe extending through said steam tube having an inner end located within the drum and an outer end extending through said body head, a syphon shoe connected to said syphon pipe inner end, and a syphon fitting mounted on said body head in communication with said syphon pipe outer end.

3. In a self-supported rotary joint as in claim 1, said bearing means comprising roller bearings.

4. In a self-supported rotary joint as in claim 3, two roller bearing sets being located within said housing axially spaced from each other, and spring means axially positioning said bearing sets to accommodate thermal expansion and maintain minimum internal clearance.

5. In a self-supported rotary joint as in claim 1, thermal insulation means defined on said nipple, said bearing means engaging and supporting said nipple.

6. In a self-supported rotary joint as in claim 5, said thermal insulation means comprising an annular recess defined in said nipple providing an air space between said bearing means and said steam tube outer end forming a thermal barrier with respect to the radial conduction of heat through said nipple.

7. In a self-supported rotary joint as in claim 5, a radially extending flange defined on said nipple located adjacent said body head, said frangible means comprising at least one shearable pin closely received within holes defined within said flange and said body head radially spaced from the drum axis of rotation.

8. In a self-supported rotary joint as in claim 5, said frangible means comprising at least two shearable pins diametrically related to each other with respect to the drum axis of rotation.

* * * * *